(12) United States Patent
Han

(10) Patent No.: US 7,617,282 B2
(45) Date of Patent: Nov. 10, 2009

(54) APPARATUS FOR CONVERTING E-MAIL DATA INTO AUDIO DATA AND METHOD THEREFOR

(75) Inventor: Mong Ju Han, Daeku (KR)

(73) Assignee: LG Electronics Inc., Seoul (KR)

( * ) Notice: Subject to any disclaimer, the term of this patent is extended or adjusted under 35 U.S.C. 154(b) by 965 days.

(21) Appl. No.: 10/621,524

(22) Filed: Jul. 18, 2003

(65) Prior Publication Data

US 2004/0010559 A1    Jan. 15, 2004

Related U.S. Application Data

(63) Continuation of application No. 09/129,092, filed on Aug. 5, 1998, now abandoned.

(30) Foreign Application Priority Data

Aug. 9, 1997    (KR) ................... 97-38046

(51) Int. Cl.
*G06F 15/16* (2006.01)
*G10L 13/08* (2006.01)
(52) U.S. Cl. ..................... 709/206; 704/260
(58) Field of Classification Search ............. 709/206, 709/207; 704/260
See application file for complete search history.

(56) References Cited

U.S. PATENT DOCUMENTS

| 5,349,636 | A |   | 9/1994 | Irribarren |
| 5,479,411 | A | * | 12/1995 | Klein ................ 379/88.13 |
| 5,621,658 | A |   | 4/1997 | Jackson et al. |
| 5,632,002 | A | * | 5/1997 | Hashimoto et al. ........ 704/231 |
| 5,647,002 | A | * | 7/1997 | Brunson ................ 709/206 |
| 5,715,370 | A |   | 2/1998 | Luther et al. |
| 5,825,854 | A |   | 10/1998 | Larson et al. |
| 5,884,262 | A |   | 3/1999 | Wise et al. |
| 5,950,123 | A |   | 9/1999 | Schwelb et al. |
| 5,953,392 | A |   | 9/1999 | Rhie et al. |
| 5,991,365 | A |   | 11/1999 | Pizano et al. |
| 5,999,594 | A |   | 12/1999 | Mizoguchi et al. |
| 6,061,718 | A |   | 5/2000 | Nelson |
| 6,070,138 | A |   | 5/2000 | Iwata |
| 6,233,318 | B1 |  | 5/2001 | Picard et al. |

FOREIGN PATENT DOCUMENTS

JP          63077253 A       4/1988

* cited by examiner

*Primary Examiner*—David Lazaro
(74) *Attorney, Agent, or Firm*—Birch, Stewart, Kolasch & Birch, LLP

(57) ABSTRACT

An apparatus and method are provided for converting an e-mail data into an audio data. The apparatus includes a communication connector connected with a communication line for controlling a transmission of an e-mail data and an e-mail audio data, a controller to control receiving and sending e-mail data pertaining to an e-mail receiving through the communication connector and controlling a conversion from the received e-mail data into e-mail message data containing gender information that pertains to a sender, contexts and texts of the e-mail, a memory for storing the received e-mail data and the e-mail message data, and an audio data generator for generating an audio signal according to the e-mail data and transmitting the contents and texts of the e-mail message data to a client through the communication connector upon client request.

20 Claims, 6 Drawing Sheets

APPARATUS FOR CONVERTING E-MAIL DATA INTO AUDIO DATA AND METHOD THEREFOR

This application is a continuation of co-pending application Ser. No. 09/129,092, filed on Aug. 5, 1998 now abandoned, the entire contents of which are hereby incorporated by reference and for which priority is claimed under 35 U.S.C. § 120; and this application claims priority of Application No. 38046/1997 filed in KOREA on Aug. 9, 1997 under 35 U.S.C. § 119.

BACKGROUND OF THE INVENTION

1. Field of the Invention

The present invention relates to an apparatus for converting an e-mail (electronic mail) data into an audio data and a method therefor, and in particular to a novel apparatus and a method therefor which make it possible to provide the contents of an e-mail in audio.

2. Description of the Background Art

As shown in FIG. 1, the conventional e-mail(electronic mail) processor is installed with a personal computer(PC) and other terminals for a PC communication.

A communication unit 1 is a circuit such as a MODEM or LAN card, etc. for communicating (receiving and/or transmitting data) between a PC or a terminal and a server using a telephone line. A microcomputer 2 connected with the communication unit 1 executes an e-mail client program and connects to the server, thereby a user can receive or transmit e-mail data. A memory 3 is connected with the microcomputer 2 for storing the e-mail data from the server. A video unit 4 connected with the microcomputer 2 converts the e-mail data into an analog signal. A display unit 5 displays the e-mail data from the video unit 4.

In the conventional art, even when a person sends an e-mail to another person, it is impossible for the e-mail receiver to check whether the e-mail has been received into the server until the e-mail receiver accesses the server. Because it is not possible to check the contents of an e-mail using only a system such as an e-mail server, a personal computer or a workstation having an e-mail client program installed therein is employed. Therefore, if there is an email received in the server, the user must access the server using the e-mail client program installed system and download the e-mail and save the e-mail into his computer. Also, even if there is no e-mail received in the server, the user would only know this by checking the server. Accordingly, with using the limited system and checking the e-mail server regardless of receiving an e-mail, the conventional art is inconvenient.

SUMMARY OF THE INVENTION

Accordingly, it is an object of the present invention to provide an apparatus and method for converting e-mail data into audio data which overcome the aforementioned problems encountered in the background art.

It is another object of the present invention to provide an apparatus for converting e-mail data into audio data and a method therefor by which a user, even in a remote area, can check the contents of an e-mail received into a server by listening over a telephone without using a computer.

To achieve the above and other objects, there is provided an apparatus for converting an e-mail (electronic mail) data into an audio data, comprising: a communication connector connected with a communication line to control a transmission of an e-mail data and an e-mail audio data; a controller to control receiving and sending e-mail data pertaining to an e-mail through the communication connector, and controlling a conversion from the received e-mail data into e-mail, message data, the e-mail message data containing gender information pertaining to a sender, contents and texts of the e-mail; a memory to store the e-mail data and the e-mail message data; and an audio data generator to generate an audio signal according to the e-mail message data and to transmit the contents and texts of the e-mail message data to a client through the communication connector upon client request, wherein an audio message data stored in the memory is attached in the e-mail message data and reproduced audibly by the audio data generator, the audio message data pertaining to certain data which is not reproduced by the audio data generator.

To achieve the above and other objects, there is provided a method for converting an e-mail data into an audio data, comprising the steps of storing an e-mail when the e-mail is received; converting the received e-mail into e-mail message data and storing the e-mail message data, the e-mail message data containing gender information pertaining to a sender, contents and texts of the e-mail; identifying a client's identification when a client requests an e-mail; converting the e-mail message data to audio data; and transmitting the contents and texts of the e-mail message data to the client as an audio signal, wherein an audio message data stored in a memory is attached in the e-mail message data and reproduced audibly as part of the audio signal, the audio message data pertaining to certain data which is not audibly reproduced.

To achieve the above and other objects, there is provided a method of converting e-mail data into audio data, comprising: detecting, from a user, a request to access an e-mail stored in a server; verifying contents of the server upon detecting the user request; converting at least a portion of the e-mail into audio data; and conveying the converted audio data to the user by simulating a voice indicating a gender of a sender of the e-mail, wherein the verifying is performed without going through an intermediary between the server and the user, wherein the portion of the e-mail is a header portion of the e-mail, a body of the e-mail includes texts, and the texts are converted into standard code format, and wherein an audio message data stored in a memory is audibly reproduced during the conveying step, the audio message data pertaining to certain data which is not audibly reproduced.

Additional advantages, objects and features of the invention will become more apparent from the description which follows.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
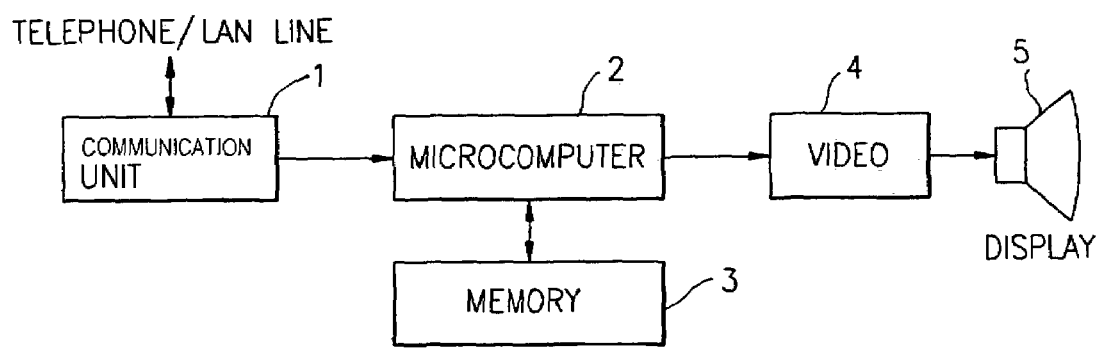
FIG. 1 is a block diagram illustrating a conventional e-mail data processor.
Figure 2:
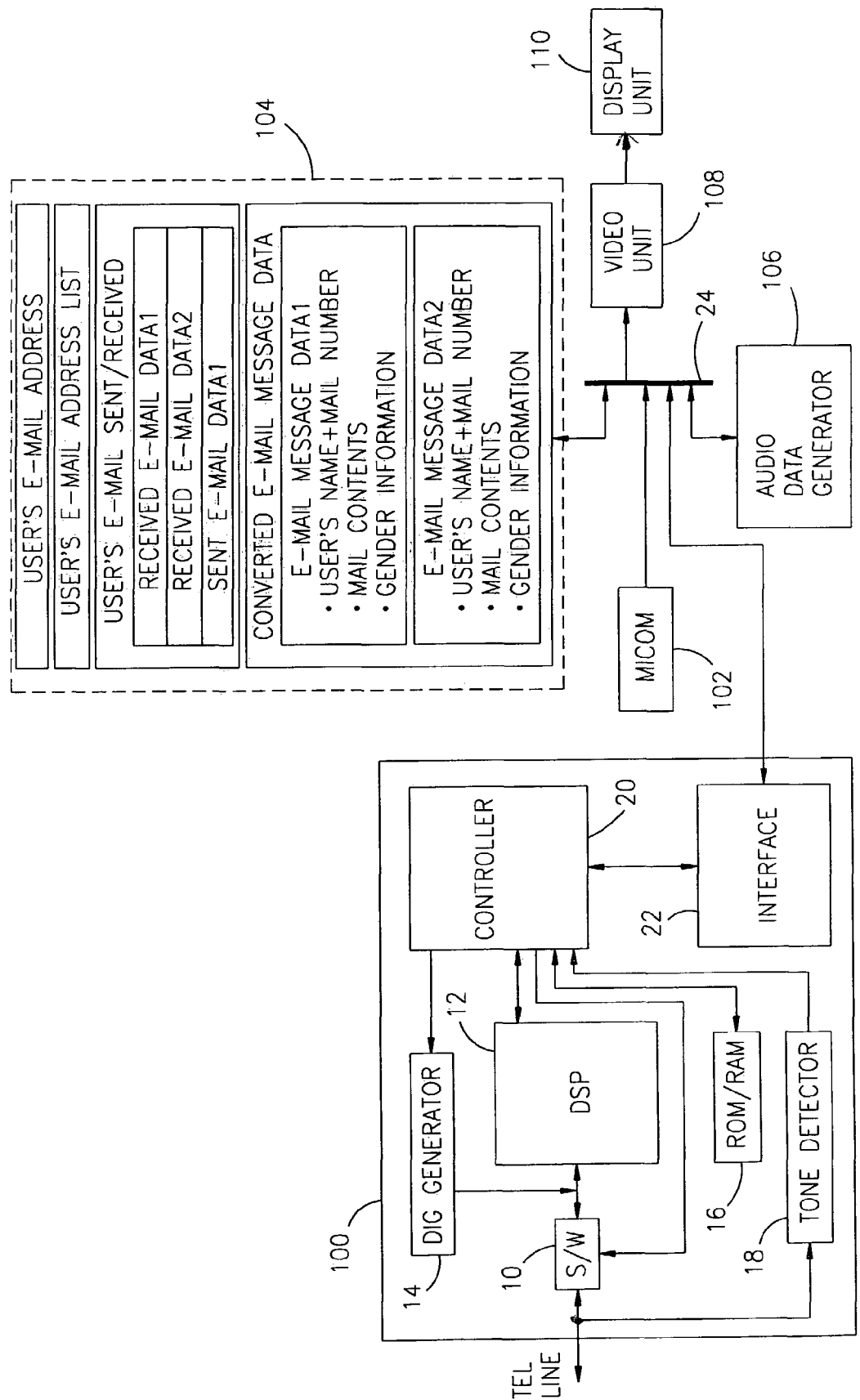
FIG. 2 is a block diagram illustrating an apparatus for converting an e-mail data into an audio data according to an embodiment of the present invention.

FIG. 2 illustrates an apparatus for converting an e-mail data into an audio data according to the present invention, which includes a communication connector 100 for connecting between a communication line and a terminal (client) and receiving/transmitting e-mail data and audio data converted from an e-mail data, a microcomputer 102 for controlling receipt/transmission of e-mail data through the communication connector 100, controlling a memory 104, controlling a video unit 108 for displaying the e-mail data, and controlling the output of audio data converted from the e-mail data, a memory 104 for storing and outputting the e-mail data received/transmitted through the communication connector 100 and e-mail message data converted from the e-mail data in accordance with a control signal of the microcomputer 102, an audio data generator 106 for converting the e-mail message data from the memory 104 into audio data and outputting the same through the communication connector 100, the video unit 108 for displaying the e-mail message on a display unit 110 in accordance with a control signal of the microcomputer 102, and the display unit 110 for displaying the e-mail message processed by the video unit 108. Also, among the above blocks all the data is transmitted by way of the bus line 24.

The communication connector 100 includes a switching unit 10 connected with a telephone line/LAN line for connecting or disconnecting the telephone line or the LAN to the digital signal processor 12 according to a control signal of the controller 20, a tone generator 14 for generating a tone signal, a tone detector 18 for detecting the received tone signal, the digital signal processor 12 which includes a digital/analog converter and an analog/digital converter, a controller 20 for controlling the elements in the communication connector 100, and an interface port 22 for connecting the microcomputer 102 and the communication connector 100. The telephone line or a communication line has a the telephone number or IP(internet protocol) address. Also, there is a ROM/RAM 16 in the communication connector 100.

Further, as shown in FIG. 2, the contents of a user's mail box in the memory 104 includes a user's e-mail address, a user's address list, a user's original e-mail data received/sent from/to another user, and an e-mail message data which will be converted into an audio data. The e-mail message data converted into the audio data stored in the format containing a user's name, mail number, mail contents, and gender identifying information, etc.

Figure 3:
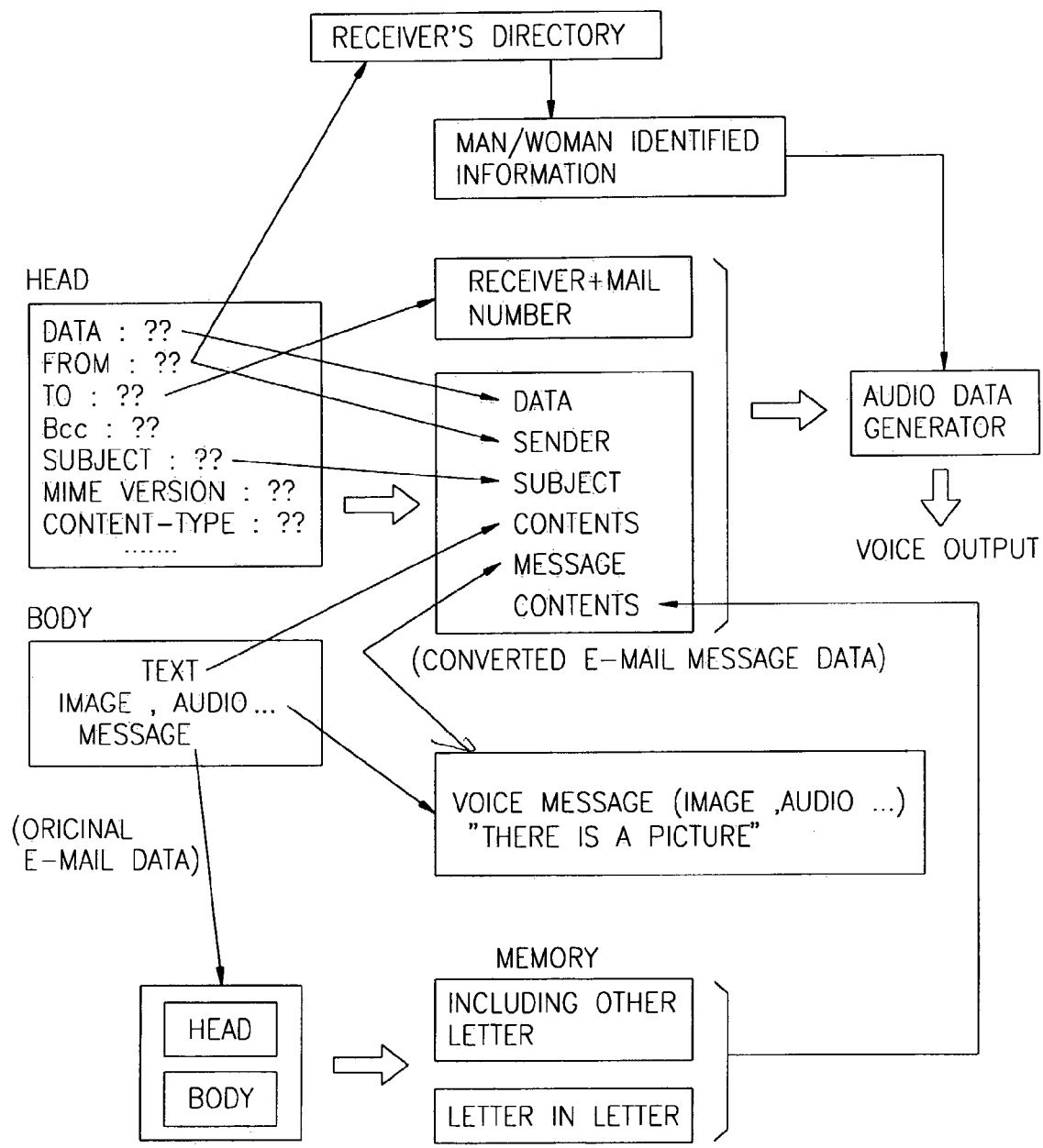
FIG. 3 is a view illustrating a routine for converting an e-mail data into an audio data according to an embodiment of the present invention.
Figure 4A:
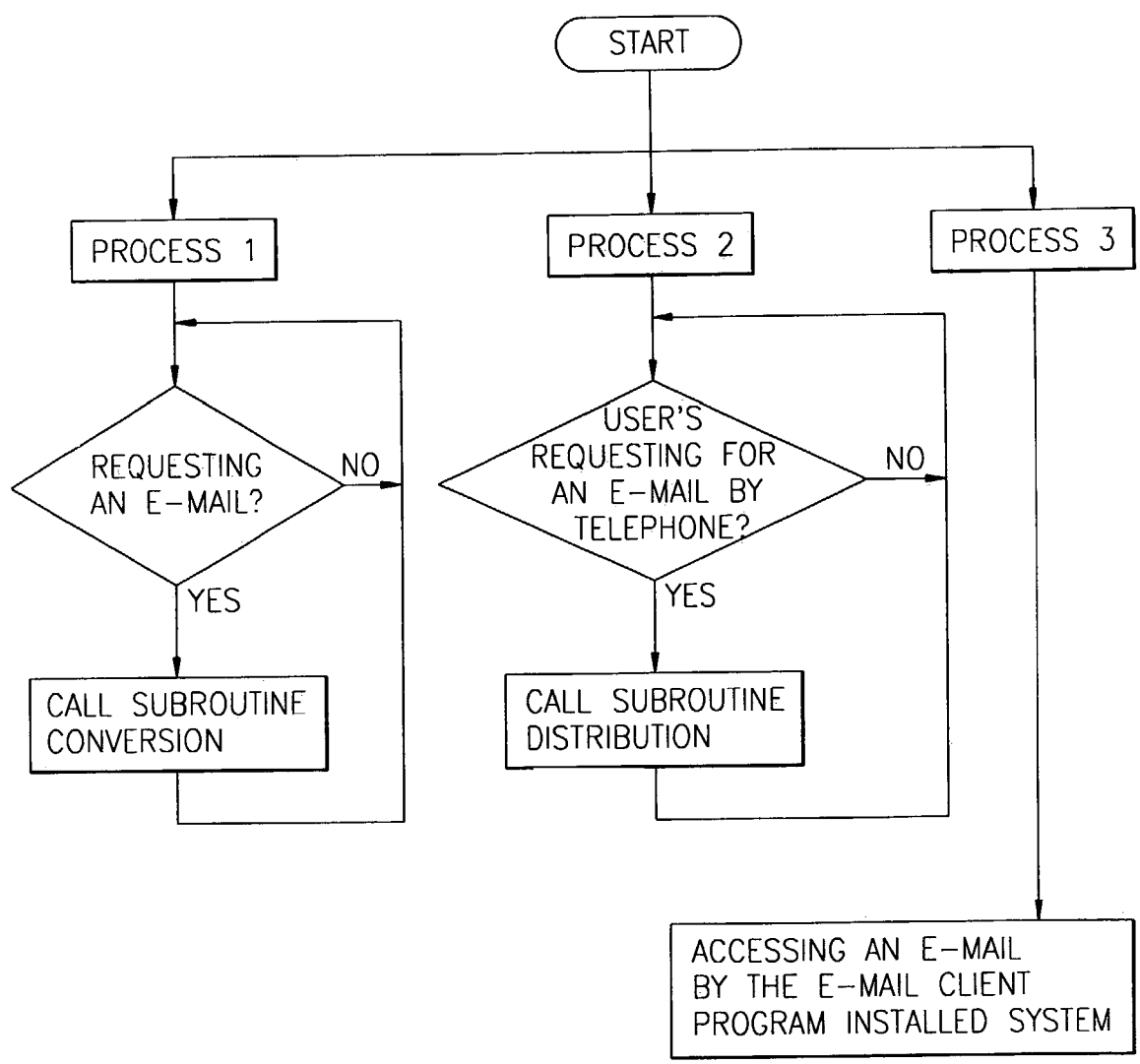
FIG. 4A is a flow chart illustrating a method for processing an e-mail data according to an embodiment of the present invention.

FIG. 3 illustrates a routine for converting an e-mail data into an audio data according to the present invention. FIG. 4A illustrates a flowchart for processing an e-mail data according to the present invention, i.e., converting an e-mail to audio data and outputting an e-mail to an e-mail client program installed system as a video signal.

Figure 4B:
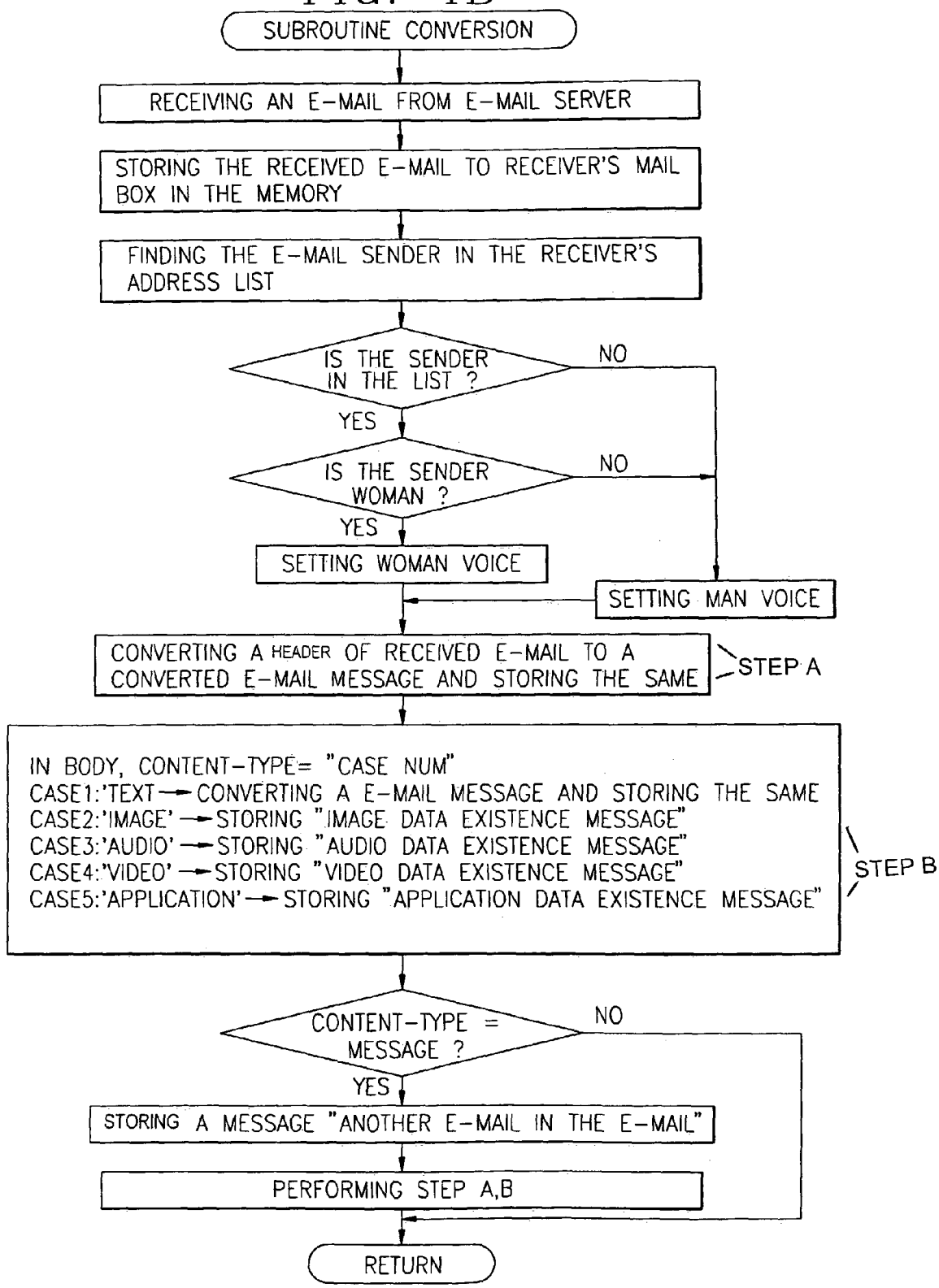
FIG. 4B is a flow chart illustrating the conversion subroutine of FIG. 4A.
Figure 4C:
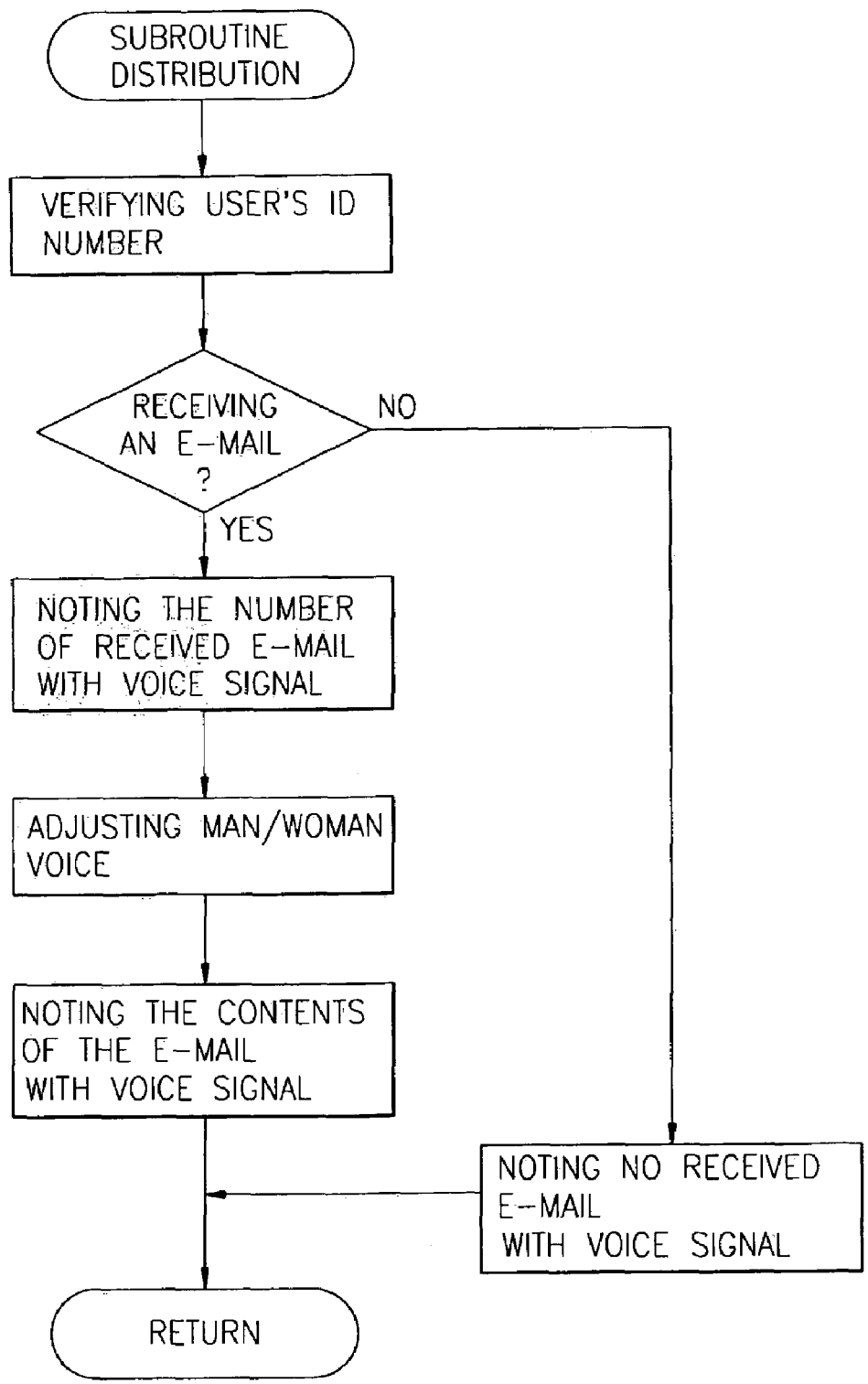
FIG. 4C is a flow chart illustrating the distribution subroutine of FIG. 4A.

FIG. 4B illustrates a detail flowchart of the conversion subroutine of FIG. 4A, and FIG. 4C illustrates a detail flowchart of the distribution subroutine of FIG. 4A.

As shown in FIGS. 2 and 4A, a user registers his/her e-mail address into the system which provides a function for converting an e-mail data into an audio data and then modifies his/her e-mail address list at any time. The address is stored into the memory 104 of the system. When a user requests access to an e-mail, the system sends/receives the e-mail to and from a user. Namely, the above-described operation is implemented as the communication connector 100 accesses the e-mail server through a telephone line in accordance with a control of the microcomputer 102 and receives an e-mail and stores the e-mail data into the memory 104. In addition, the e-mail is read from the memory 104 and then is sent through 'the communication connector 100.

The e-mail data is converted to an e-mail message data for outputting as an audio signal and the converted e-mail message data is stored in the memory 104. Then, the converted e-mail message data is converted into an audio signal in the audio data generator 106, so that the audio signal is outputted through the communication connector 100, whereby a user receives the audio message containing the e-mail contents.

The e-mail message data for an audio conversion contains a sender's name, a sending date, subject, and e-mail contents. In addition, the e-mail message data contains information for identifying the gender of an e-mail sender for reproducing a man/woman voice when converting the e-mail data into an audio data using the address list based on whether or not the sender is registered, and information for the number of e-mails sent.

When a user located in a remote local area accesses the e-mail server system through a telephone line, the system verifies the user's ID and whether an e-mail is received or not. If an e-mail is received in the e-mail server system, the audio data generator 106 of the e-mail server system converts the e-mail message data into an audio signal, so that the user receives audio data containing the contents of the e-mail.

In accordance with the present invention, there are three processes, process 1, process 2 and process 3, as shown in FIG. 4A. If a user requests access to an e-mail, the process 1 is performed as shown in FIG. 4B. If the user requests verification on whether any e-mail is received for the user, the process 2 is performed as shown in FIG. 4C. The process 3 is performed when the user received an e-mail with an e-mail client program installed system.

When the user requests an e-mail transmission to the system which is capable of converting the e-mail data into an audio data will be explained with reference to FIG. 4A.

The microcomputer 102 receives an e-mail requested by the e-mail server through the communication connector 100, and the received e-mail is stored into the memory 104.

In addition, the sender of the e-mail is checked from the address list. Thereafter, the sender is judged to be registered in the address list. If the sender is not registered in the address list, the audio conversion is set for male, and the process "A" (Step A in FIG. 4B) is performed.

If the sender is registered in the address list, the gender of the sender is checked, and as a result of the checking, the audio conversion is determined. Thereafter, the process "B" (Step B in FIG. 4B) is performed.

In the process "A", a header portion of the e-mail is converted into e-mail message data which is then stored into the memory 104. In the process "B", the contents of the e-mail body is analyzed. Thereafter, the message corresponding to whether a graphic, image, or audio data is contained in the e-mail data is stored in the memory 104.

The conversion method of the e-mail data which is implemented in the processes "A" and "B" is illustrated in FIG. 3.

As shown in FIG. 3, the e-mail generally includes a header portion containing a sending date, sender, receiver, subject, etc. and a body portion containing a text, image, audio, message, etc.

Namely, the header portion of the e-mail is formed of a US-ASCII format and includes items such as "From:??" representing the address of. the e-mail sender, "Date:??" representing when the e-mail is sent, "To:??" representing the receiver of the e-mail, "Subject:??" representing the subject of the e-mail, "MIME (Multipurpose Internet Mail Extension) version:??" representing the version of the Internet mail extension (including graphic or audio data), "Content-Type: ??" representing whether the body of the e-mail includes a text file, a message file (mail in mail), an image file, an audio file, MPEG file, a certain application, etc., and "Boundary Name:" representing the boundary of various file formats.

The body of the e-mail is divided into the data such as a text, message, image, video, audio, etc. based on the boundary name determined in accordance with the information of the content type of the head portion of the e-mail.

The text portion is defined by various character sets in the content type portion. If the text portion is formed of US-ASCII format, the text is converted into the ASCII format. If the text portion is formed of Korean (character set=euc-kr or iso2022-kr), English is directly converted into ASCII format. If the text portion is formed of special codes, not numerical digits, the special codes are deleted. In the case of "iso-2022-kr", the text portion is converted with respect to the Korean character set.

The "iso-2022-kr" is a Korean mail transmission standard format. The Korean character set is formed between SO (14th character in ASCII) and SI (15th character in ASCII), and the MSB (Most significant Bit) is indicated as "0", and in the case of series Korean set, SO and SI are set before the first and end characters of the series Korean set. In this case, English characters use ASCII (20th through 127th characters).

The "euc-kr" is named in accordance with the method for naming the character code set generally used for the Internet. The "euc-kr" uses two byte character sets as a completeness type Korean. Namely, the "euc-kr" corresponds to "KSC5601" which is a Korean completeness type code and includes an English character set and symbols in the format of ASCII.

The "iso-2022-kr" converts the MSB to 0 for transmitting the same. Therefore, the MSB between SO and SI is changed to "1".

Since the data such as an audio, image, certain type of data, etc. is not reproduced as an audio data, the audio message data stored in the memory 104 is attached.

For example, in the case of the image, an audio message data such as "Image is included" is attached.

In addition, if there is a message in the body, namely, if there is a mail in the mail, the audio message "Another mail is included in the mail" is outputted from the memory 23 for storing the same. The header and body portions of the message are analyzed in the above-described manner for thereby converting the data format to ASCII.

In order to reproduce the head and body portions of the e-mail data as an audio signal using the audio data generator, a predetermined editing process is required. The data used as an input of the audio data generator is converted into the ASCII format and then is stored.

Namely, the e-mail message data converted for the audio data generation includes a portion containing a sender's name and information concerning an e-mail number, a portion containing gender identification information when outputting to the audio data generator, and a portion containing a mail content to be converted in the forms of audio.

The received e-mail data is stored into the memory 104, and the e-mail data is converted into an audio conversion e-mail message data (including an editing operation) and is stored into the memory 104. If an authorized user wishes to download the e-mail changed to the audio form using a telephone line, the e-mail contents changed to the audio form by the audio data generator is transmitted.

The audio data generator 106 supports an English character set and completeness Korea code and is designed to select male or female. The audio data generator may be configured to implement a D/A conversion using a software program by which the documents made by "JETSPEED (manufactured by Geowon system Co., Korea)" is changed to a digital audio data.

FIG. 4C illustrates a response flow with respect to a user's mail identification according to an embodiment of the present invention.

When the user access the audio conversion system of the e-mail data using a telephone and the user's ID, the microcomputer 102 verifies the user's ID and determines whether the access is authorized.

In the case of an authorized user, the memory 104 is checked to see whether an e-mail is received for the user. In the case that the e-mail is not received, a message indicating that there is no e-mail received is sent to the user through the audio data generator 106. If an e-mail is received for the user, a message corresponding to the number of the e-mails is sent in the form of an audio message.

The voice of the male or female is determined with reference to the audio conversion e-mail message data stored in the memory 104. The audio data generator 106 generates an audio signal corresponding to the received e-mail conversion data and transmits the generated audio signal to the user through the communication connector 21, so that the user can check the contents of the e-mail in audio.

As shown in FIG. 4, the received e-mail data is converted into the audio conversion e-mail message and is stored into the memory 104. So far, when the e-mail receiving verification request is received, the operation of generating and outputting an audio signal was explained. The operations, where the received email is stored and then when an e-mail receiving verification request is received, the audio conversion e-mail message conversion is performed with respect to only the e-mail for the user, and the audio signal generated is outputted, are implemented in the same manner as the above-described operation.

The audio conversion apparatus and a method thereof according to the present invention are readily applicable to an e-mail service server system and a system which operates only a client program.

Namely, in the case of TV, PC, etc. having a function capable of automatically receiving e-mails, the service system according to the present invention is well applicable to the same, so that a remote user can check the contents of his/her e-mail by audio by accessing the e-mail server using a telephone line. In addition, it is possible to directly check the contents of the e-mail converted into the audio data by connecting the output from the audio data generator to speakers or other audio machines.

In the present invention, in the service system or a user's system, the e-mail made by the user is converted into the audio conversion message of FIG. 3 and then is stored. The resultant data is converted into an audio signal by the audio data generator 106. The user calls another user not having an e-mail system and converts the contents of the e-mail into an audio signal for thereby transmitting the converted audio signal.

The user in a remote area accesses the e-mail service system and checks the contents of the e-mail converted into the audio data using an audio conversion function and a telephone line compared to the convention art in which the user checks the contents of e-mail using a system capable of performing a client program by accessing the e-mail server.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for converting e-mail (electronic mail) data into audio data, comprising:
   a communication connector connected to an e-mail server via a communication line and comprising:
   a controller configured to control a conversion of e-mail data received from the server into e-mail message header data, e-mail content data and e-mail attachment-type data, and
   an audio data generator configured to convert the e-mail message header data, e-mail content data and e-mail attachment-type data into audio data including corresponding audio header data, audio content data and audio attachment-type identifier data, the audio attachment-type identifier data being an announcement of the existence and type of an attachment to the e-mail; and
   a memory configured to store the e-mail data and the audio data,
   wherein the communication connector operates to transmit the audio data to a client upon the client's request, and
   wherein the e-mail data further includes gender information and the audio data generator is configured to generate an audio signal in a male voice if the gender information identifies that a sender of the e-mail data is a male sender registered in an e-mail address list, and to generate the audio signal in a female voice if the gender information identifies that the sender of the e-mail data is a female sender registered in the e-mail address list.

2. The apparatus of claim 1, further comprising an e-mail client program installed system.

3. The apparatus of claim 1, further comprising:
   a video unit configured to process the e-mail message data; and
   a display unit configured to display the e-mail message data processed by the video unit.

4. The apparatus of claim 1, wherein the plural attachment types comprise an image-type attachment, a video-type attachment, an audio-type attachment, and an e-mail-type attachment.

5. The apparatus of claim 1, wherein the e-mail message header information identifies a sender's name, a sending date, and a subject of the e-mail.

6. The apparatus of claim 5, wherein the controller is further configured to identify a total number of e-mails received by the apparatus and audio data generator is configured to generate a corresponding audio message to send to the client.

7. The apparatus of claim 1, wherein the male voice is also not of a receiver of the e-mail, and the female voice is also not of a receiver of the e-mail.

8. A method for converting e-mail (electronic mail) data into audio data, comprising the steps of:
   receiving an e-mail data from an e-mail server, wherein the e-mail data comprises gender information;
   storing the e-mail data received from the e-mail server as e-mail message header data, e-mail content data and e-mail attachment-type data;
   receiving a request to retrieve the e-mail data, including verifying a requestor's identification;
   converting the e-mail message header data, e-mail content data and e-mail attachment-type data to audio header data, audio content data and audio attachment-type identifier data, the audio attachment-type identifier data being an announcement of the existence and type of an attachment to the e-mail;
   saving in a memory the audio header data, audio content data and audio attachment-type identifier data; and
   transmitting the audio header data, audio content data and audio attachment-type identifier data to the client as an audio signal,
   wherein the transmitting step comprises generating the audio signal in a male voice if the gender information identifies that a sender of the e-mail data is a male sender registered in an e-mail address list, and generating the audio signal in a female voice if the gender information identifies that the sender of the e-mail data is a female sender registered in the e-mail address list.

9. The method of claim 8, wherein in said audio converting and storing steps, identification information of the sender of the e-mail is checked and an audio conversion is implemented based on the checked result.

10. The method of claim 8, wherein the identifying step includes a step of judging whether there is an e-mail received after the client's identification has been identified.

11. The method of claim 10, further comprising a step of transmitting a message indicating that the e-mail is not received when the e-mail is not received.

12. The method of claim 8, further comprising a step of referencing the sender of the e-mail in an address list.

13. The method of claim 8, wherein said identifying step is implemented using a telephone line or using a direct access to an e-mail service system.

14. The method of claim 8, wherein the e-mail data includes gender information of a sender of the e-mail, and said audio signal is generated based on the gender of the sender of the e-mail.

15. The method of claim 14, wherein said audio signal is generated in a male voice that is not the sender's if the gender information identifies that the sender of the e-mail is a male, and said audio signal is generated in a female voice that is not the sender's if the gender information identifies that the sender of the e-mail is a female.

16. The method of claim 15, wherein the male voice is also not of a receiver of the e-mail, and the female voice is also not of a receiver of the e-mail.

17. The method of claim 8, wherein the plural attachment types comprise an image-type attachment, a video-type attachment, an audio-type attachment, and an e-mail-type attachment.

18. The method of claim 8, wherein the header information identifies a name of a sender, a sending date, and a subject of the e-mail.

19. The method of claim 18, wherein the e-mail message data further identifies a total number of e-mails directed to the client.

20. An apparatus for converting e-mail (electronic mail) data into audio data, comprising:
   a communication connector connected to an e-mail sever via a communication line;
   a controller configured to control a conversion of e-mail data received from a server into e-mail message header data, e-mail content data and e-mail attachment-type data;
   an audio data generator configured to convert the e-mail message header data, e-mail content data and e-mail attachment-type data into audio data including corresponding audio header data, audio content data and audio attachment-type identifier data, the audio attachment-type identifier data being an announcement of the existence and type of an attachment to the e-mail, wherein the e-mail message header information identifies a sender's name, a sending date, and a subject of the e-mail;

a memory configured to store the e-mail data and the audio data;

a video unit configured to process the e-mail message data; and a display unit configured to display the e-mail message data processed by the video unit, wherein the communication connector operates to transmit the audio data to a client upon client's request, wherein the e-mail data further includes gender information and the audio data generator is configured to generate an audio signal in a male voice if the gender information identifies that the sender of the e-mail is a male sender registered in an e-mail address list, and to generate the audio signal in a female voice if the gender information identifies that the sender of the e-mail is a female sender registered in the e-mail address list, and wherein the controller is further configured to identify a total number of e-mails received by the apparatus and the audio data generator is configured to generate a corresponding audio message to send to the client.

* * * * *